United States Patent
Webb, Jr.

(10) Patent No.: US 6,719,179 B1
(45) Date of Patent: Apr. 13, 2004

(54) SADDLEBAG PROTECTING DEVICE

(76) Inventor: Richard O. Webb, Jr., 13130 Ritchie Rd., Smithsburg, MD (US) 21783

( * ) Notice: Subject to any disclaimer, the term of this patent is extended or adjusted under 35 U.S.C. 154(b) by 252 days.

(21) Appl. No.: 09/965,733

(22) Filed: Sep. 27, 2001

(51) Int. Cl.$^7$ ................. B62J 7/04; B62J 9/00
(52) U.S. Cl. ................. 224/413; 224/422; 224/452; 224/457; 224/460
(58) Field of Search ................. 224/413, 422, 224/430, 431, 452, 453, 457, 458, 434, 440, 419, 425, 460, 42.32, 568, 42.39, 42.38

(56) References Cited

U.S. PATENT DOCUMENTS

| | | | |
|---|---|---|---|
| 2,776,790 A | | 1/1957 | Zbikowski |
| 2,783,927 A | * | 3/1957 | Harley ................. 224/430 |
| 3,013,814 A | * | 12/1961 | Becks ................. 224/422 |
| 3,414,223 A | * | 12/1968 | Pawsat ................. 224/422 |
| 3,734,534 A | * | 5/1973 | Brooks et al. ................. 280/165 |
| 3,837,545 A | * | 9/1974 | Rogers, Jr. ................. 224/413 |
| 3,934,770 A | * | 1/1976 | Larsen ................. 224/434 |
| 4,096,980 A | | 6/1978 | Clow |
| 4,230,245 A | * | 10/1980 | Pold et al. ................. 224/413 |
| 4,349,138 A | * | 9/1982 | Bruhn ................. 224/413 |
| D271,389 S | * | 11/1983 | Turkington et al. ................. D12/407 |
| 4,480,773 A | | 11/1984 | Krauser |
| 4,501,384 A | * | 2/1985 | Itoh ................. 224/419 |
| 5,222,639 A | * | 6/1993 | Simonett ................. 224/458 |
| D376,344 S | * | 12/1996 | Gogan et al. ................. D12/407 |
| 5,664,715 A | * | 9/1997 | Gogan et al. ................. 224/413 |
| 5,687,894 A | * | 11/1997 | Cavallaro ................. 224/457 |
| D394,632 S | | 5/1998 | Miller |
| 5,762,249 A | | 6/1998 | Hann |
| 6,068,075 A | | 5/2000 | Saiki |
| 6,293,450 B1 | * | 9/2001 | Aron ................. 224/430 |
| 6,443,344 B1 | * | 9/2002 | Nicosia et al. ................. 224/413 |

* cited by examiner

*Primary Examiner*—Nathan J. Newhouse

(57) ABSTRACT

A saddlebag protecting device prevents saddlebags from contacting the exhaust system of a motorcycle. The saddlebag protecting device includes a frame having a perimeter wall. A bracket is attached to the perimeter wall of the frame. A fastening member may be extended through the bracket for removably fastening the frame to a motorcycle such that a plane of the frame is generally horizontally orientated.

4 Claims, 2 Drawing Sheets

SADDLEBAG PROTECTING DEVICE

BACKGROUND OF THE INVENTION

Field of the Invention

The present invention relates to bag protecting devices and more particularly pertains to a new saddlebag protecting device for preventing saddlebags from contacting the exhaust system of a motorcycle.

SUMMARY OF THE INVENTION

The present invention meets the needs of a device for protecting saddlebags by providing a device including a frame having a perimeter wall. A bracket is attached to the perimeter wall of the frame. A fastening member may be extended through the bracket for removably fastening the frame, to a motorcycle such that a plane of the frame is generally horizontally orientated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
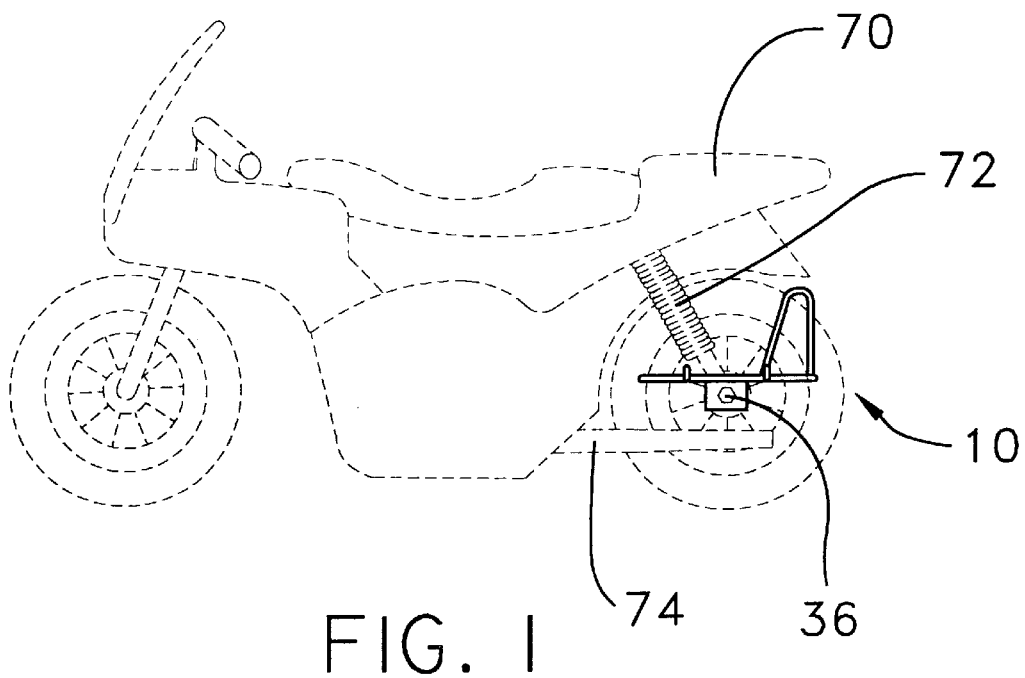
FIG. 1 is a schematic side view of a new saddlebag protecting device according to the present invention.
Figure 2:
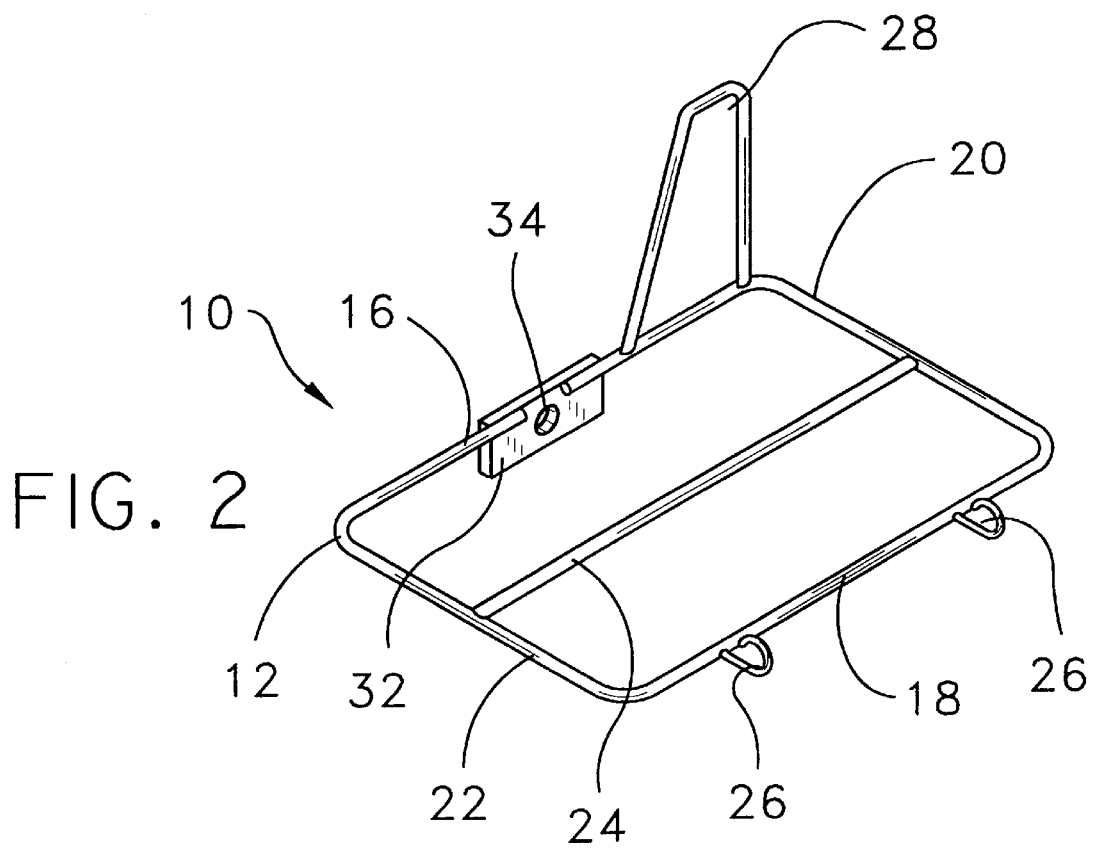
FIG. 2 is a schematic perspective view of the present invention.
Figure 3:
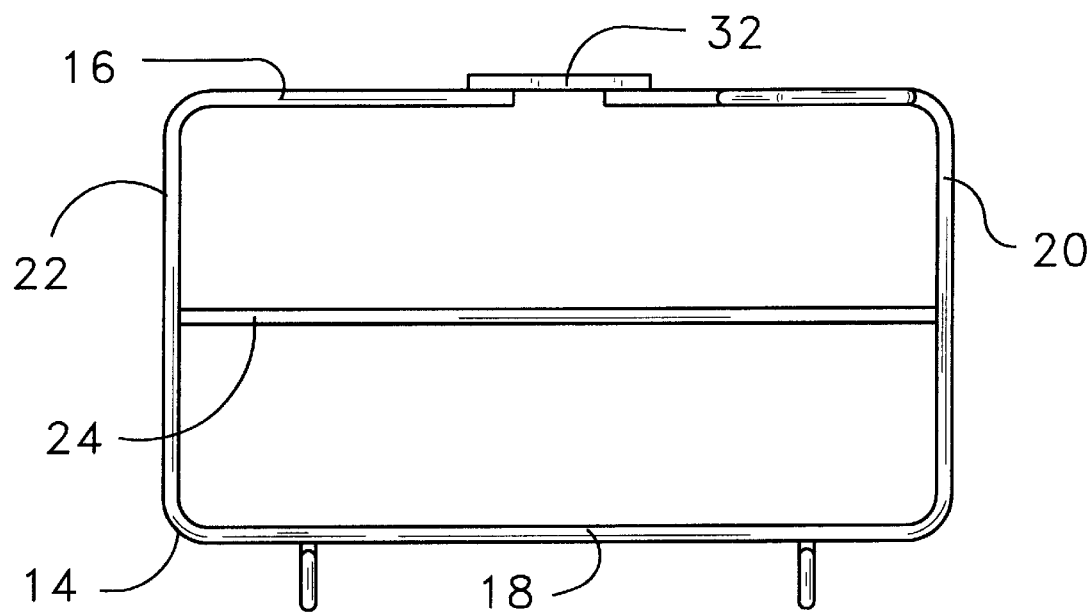
FIG. 3 is a schematic top view of the present invention.
Figure 4:
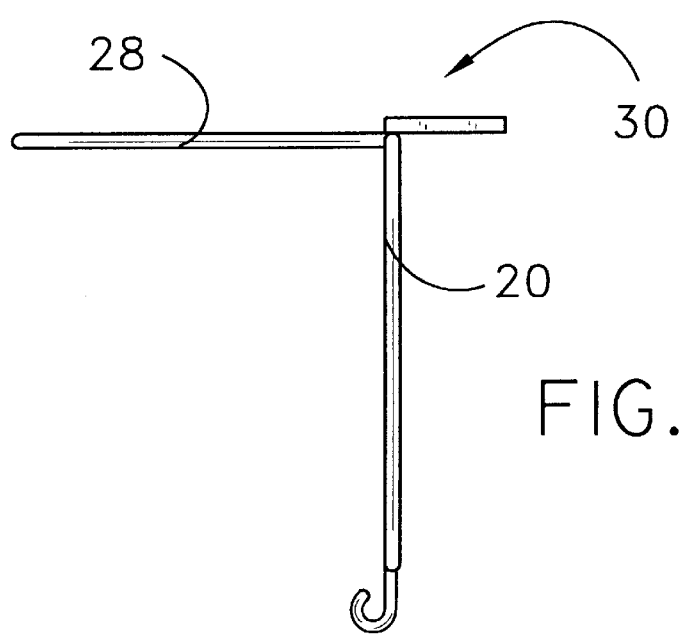
FIG. 4 is a schematic end view of the present invention.

With reference now to the drawings, and in particular to FIGS. 1 through 4 thereof, a new saddlebag protecting device embodying the principles and concepts of the present invention and generally designated by the reference numeral 10 will be described.

As best illustrated in FIGS. 1 through 4, the saddlebag protecting device 10 generally comprises a frame 12 having a perimeter wall 14 The perimeter wall has a generally rectangular shape such that a first bar 16, a second bar 18, a third bar 20 and a fourth bar 22 are defined. The first 16 and second 18 bars are positioned opposite of each other. A support bar 24 extends between the third 20 and fourth 22 bars and is orientated generally parallel to the first bar 16. A plurality of hooks 26 is attached to the frame 12. Each of the hooks 26 is attached to the second bar 18.

A guard member 28 is attached to the frame 12 and is orientated generally perpendicular to a plane of the frame 12. The guard member 28 is attached to the first bar 16 and is positioned generally adjacent to the third bar 20.

A bracket 30 is attached to the perimeter wall 14 of the frame 12. The bracket 30 comprises a plate 32 attached to the first bar 16 and is orientated generally perpendicular to the plane of the frame 12. The plate 32 has an aperture 34 extending therethrough. The plate 32 extends in an opposite direction with respect to the guard member 28.

In use, a fastening member 36 may be extended through the aperture 34 for removably fastening the frame 12 to the motorcycle 70 such that the plane of the frame 12 is generally horizontally orientated. The fastener 36 is preferably the bottom bolt of a motorcycle shock absorber 72. When in position, the device 10 ensures that saddlebags do not come in contact with the exhaust pipes 74 of the motorcycle 70.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bag protecting device for removably positioning on a motorcycle, said device comprising:

a frame having a perimeter wall, said perimeter wall has a generally rectangular shape such that a first bar, a second bar, a third bar and a fourth bar are defined, said first and second bars being positioned opposite of each other;

a bracket being attached to said first bar and being orientated generally perpendicular to a plane of said frame, wherein a fastening member may be extended through said bracket for removably fastening said frame to the motorcycle such that a plane of said frame is generally horizontally orientated;

a support bar extending between said third and fourth bars and being orientated generally parallel to said first bar; and a guard member being attached to said frame and being orientated generally perpendicular to the plane of said frame, said guard member being attached to said first bar, said guard member extending in an opposite direction with respect to said bracket.

2. The bag protecting device as in claim 1, further including a plurality of hooks being attached to said frame, each of said hooks being attached to said second bar.

3. The bag protecting device as in claim 1, wherein said bracket comprises a plate having an aperture extending therethrough, wherein the fastening member is extended through said aperture for removably fastening said frame to the motorcycle.

4. A bag protecting device for removably positioning on a motorcycle, said device comprising:

a frame having a perimeter wall, said perimeter wall having a generally rectangular shape such that a first bar, a second bar, a third bar and a fourth bar are defined, said first and second bars being positioned opposite of each other, a support bar extending between said third and fourth bars and being orientated generally parallel to said first bar;

a guard member being attached to said frame and being orientated generally perpendicular to a plane of said frame, said guard member being attached to said first bar and being positioned generally adjacent to said third bar;

a bracket being attached to said perimeter wall of said frame, said bracket comprising a plate attached to said first bar and being orientated generally perpendicular to said plane of said frame, said plate having an aperture extending therethrough, said plate extending in an opposite direction with respect to said guard member, wherein a fastening member may be extended through said aperture for removably fastening said frame to the motorcycle such that said plane of said frame is generally horizontally orientated; and a plurality of hooks being attached to said frame, each of said hooks being attached to said second bar.

\* \* \* \* \*